UNITED STATES PATENT OFFICE.

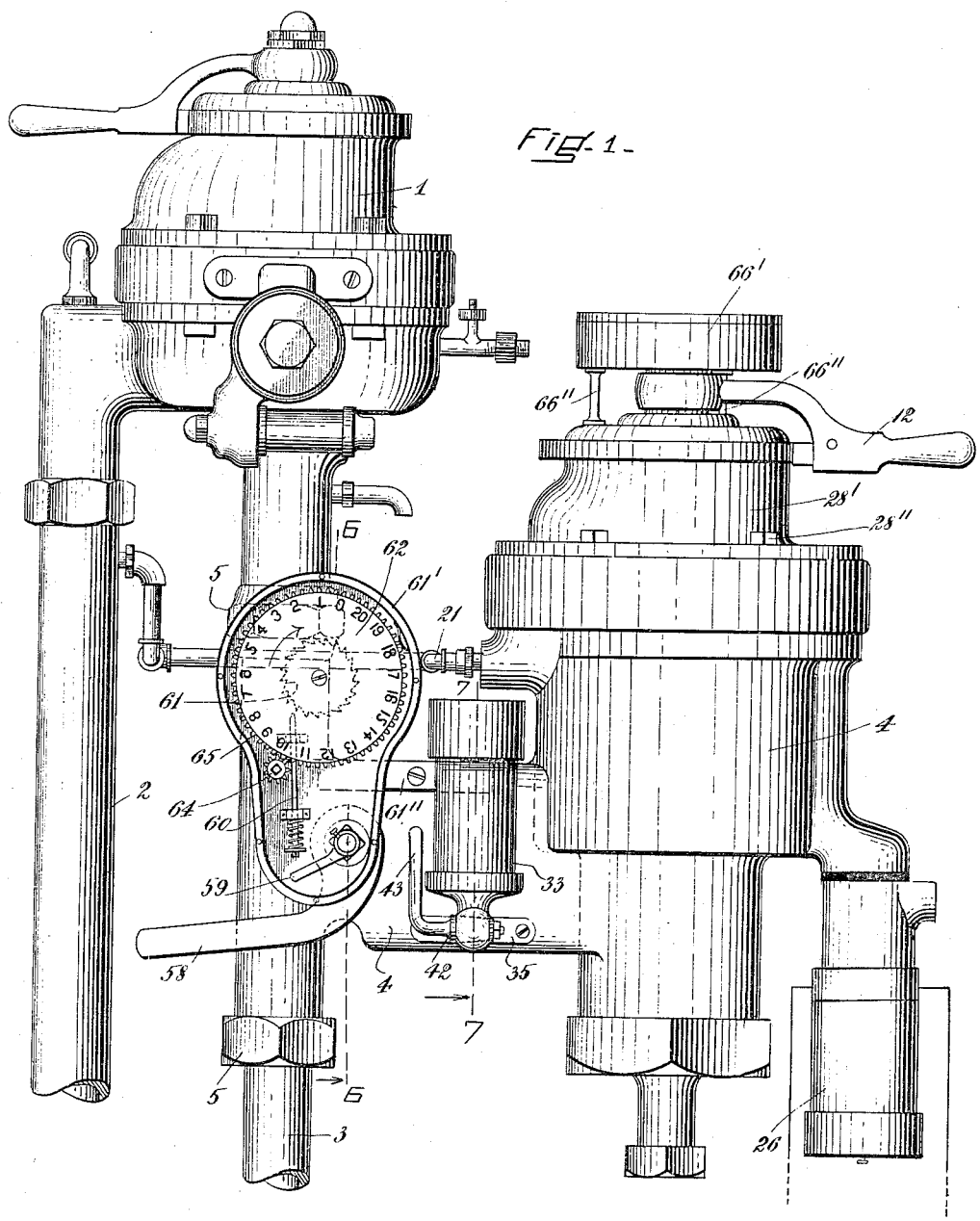

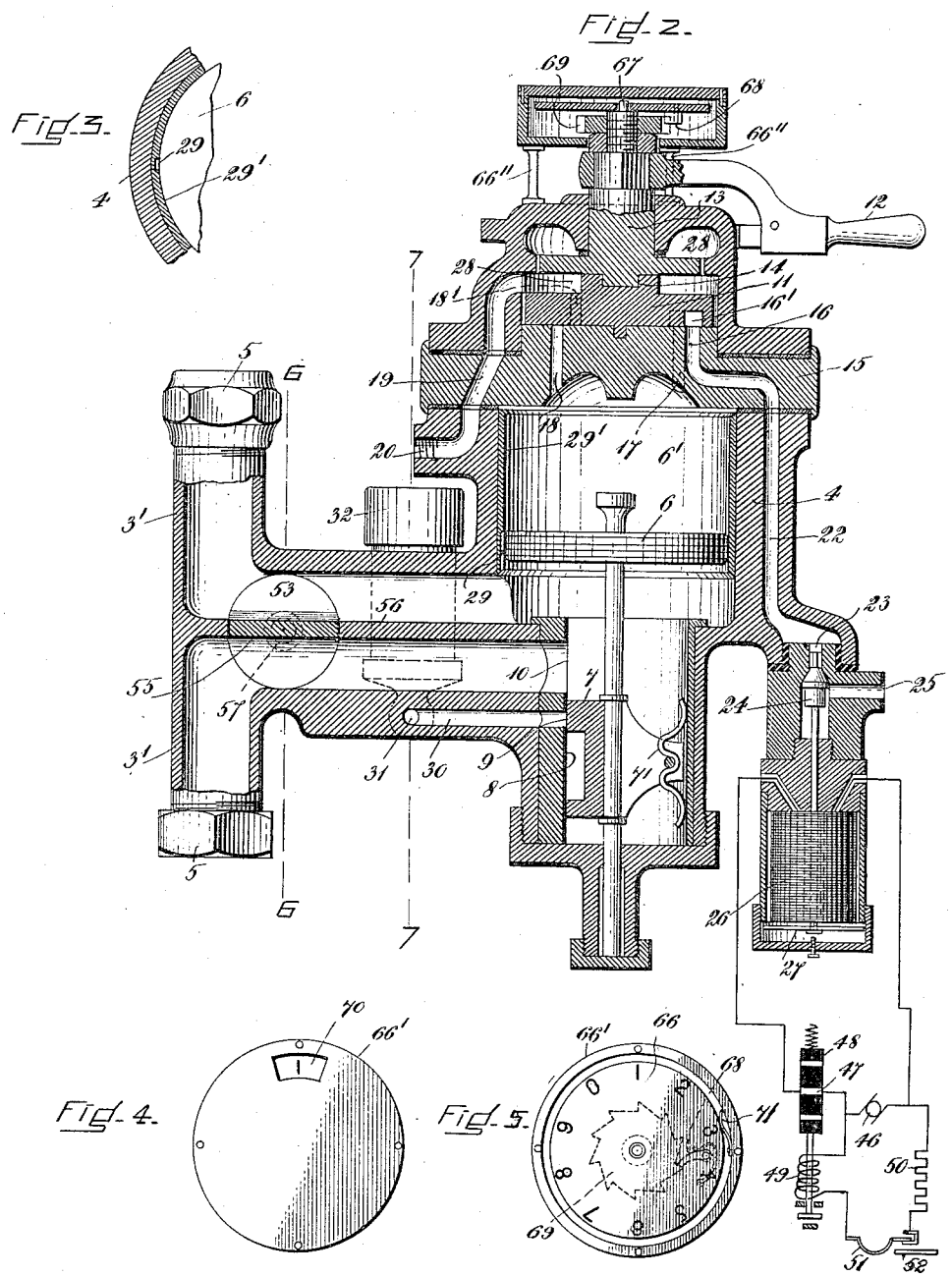

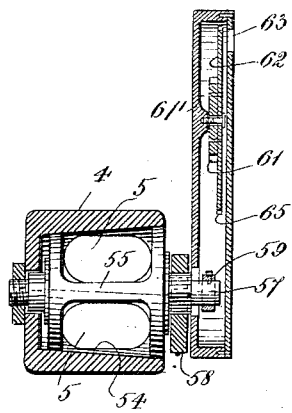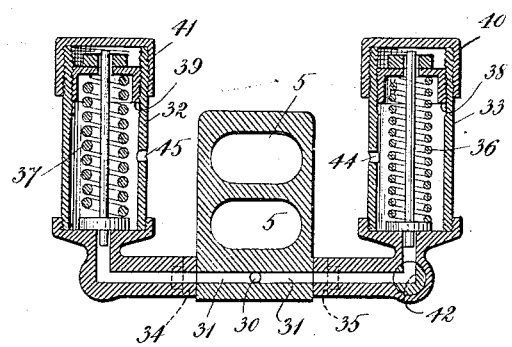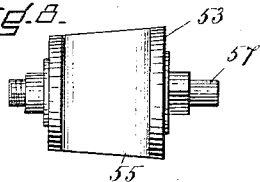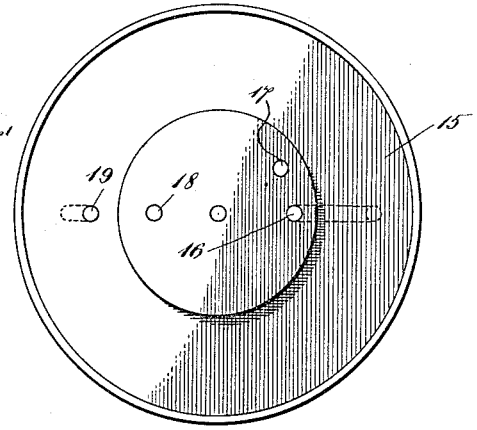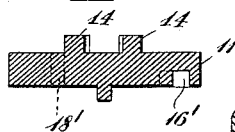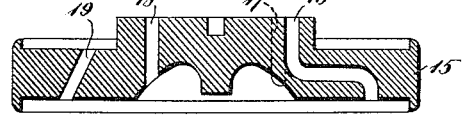

ELDRIDGE IRVING LA COUNT, OF WORCESTER, MASSACHUSETTS, ASSIGNOR TO ORCUTT AUTOMATIC TRAIN CONTROL COMPANY, OF WORCESTER, MASSACHUSETTS, A CORPORATION OF ARIZONA.

APPARATUS FOR ELECTRICALLY CONTROLLING AIR-BRAKES.

1,285,246.

Specification of Letters Patent.

Patented Nov. 19, 1918.

Application filed October 11, 1916. Serial No. 125,112.

*To all whom it may concern:*

Be it known that I, ELDRIDGE I. LA COUNT, a citizen of the United States, and a resident of Worcester, in the county of Worcester and State of Massachusetts, have invented a new and useful Improvement in Apparatus for Electrically Controlling Air-Brakes, of which the following is a specification.

The present invention which is an improvement on the apparatus described in Patent No. 1,114,642 issued October 20, 1914 on the application of Edward L. Orcutt, relates to and constitutes a part of an automatic electrically-actuated train-controlling system, and its objects are, first, to provide means for simplifying said apparatus and increasing the efficiency thereof; second, to provide a manually operated valve for cutting out the automatic control system from the regular air-brake equipment; third, to provide a register to show the instances of operation of said manually operated valve; and, fourth, to provide a register to show the instances of operation of the rotary valve whereby the brakes are released after having been applied by the automatic control system.

With these and other objects in view my invention comprises a rotary valve for controlling the automatic system, by means of which valve air from the main reservoir is admitted to a chamber containing a movable abutment, such as a piston, when the valve is in cut-out position only, and by means of which said chamber is connected only to a normally closed passage way the end of which is open to the atmosphere when the valve is in running position.

My invention also comprises means whereby the said movable abutment is normally maintained in equilibrium, the pressure from the train pipe acting on both faces of said abutment.

My invention further comprises a manually operated valve for disconnecting the automatic control system from the regular air-brake equipment and means for registering the number of times said valve is operated by the engineer during a run; and also means for registering the instances of operation of the rotary valve to release the brakes after they have been set by the automatic control system.

One embodiment of my invention is shown in the accompanying drawings in which—

Figure 1 is an elevation of an air-brake equipment provided with my improved apparatus for electrically controlling the airbrakes. Fig. 2 is a longitudinal vertical section. Fig. 3 is a fragmentary horizontal section of the casing 4. Fig. 4 is a plan view of the register which shows the number of times the rotary valve is operated during a run. Fig. 5 is a plan view of said register with the cover plate removed. Fig. 6 is a section taken on the line 6—6 of Figs. 1 and 2. Fig. 7 is a section taken on the line 7—7 of Figs. 1 and 2. Fig. 8 is a plan view of the valve for disconnecting the automatic control system from the air-brake equipment. Fig. 9 is a plan view of the rotary valve. Fig. 10 is a transverse section of said valve. Fig. 11 is a plan view of the rotary-valve seat. Fig. 12 is a transverse section of said valve seat.

In that embodiment of my invention selected for illustration the engineer's airbrake valve of the usual air-brake equipment is shown at 1, said valve regulating the communication between the pipe 2 which is connected to the main reservoir and carries about ninety pounds pressure, and the train-line pipe 3 which is connected to the air-brakes and which carries a pressure of about seventy pounds. The pipe ends 3', 3' of the casing 4 are connected to the train pipe by means of the nuts 5 and the casing contains a movable abutment 6 shown in the present instance as a piston arranged for reciprocation in the chamber 6' of said casing. The blanking-valve 7 held by the spring 7' to its seat 8 is arranged to be actuated by the rod of the piston 6 and said valve when in normal position covers the port 9 in the casing, as shown in Fig. 2. When the piston is raised the blanking-valve moves over the port 10 of the casing 4 and thereby opens communication between the lower train-line pipe 3 and said port 9 for the purpose hereinafter specified.

The rotary valve 11, arranged to be actuated by the handle 12 and the stem 13 which terminates in a key fitting into the key way formed between the lugs 14, 14, is located over the valve seat 15 secured to the top of the casing 4 and the ports therein coöperate with the ports in said valve seat as follows: The valve seat is provided with ports 16, 17 and 18, and with the passage-way 19 which is in communication with the passage-way 20 of the casing and the latter by means of the pipe 21 is connected to the main reservoir pipe 2. The valve is provided with a chamber 16' which is in communication with the ports 16, 17 of the valve seat when the handle 12 is in running position, and with the port 18' which when said handle is in cut-out position is in communication with the port 18 of the valve seat, said chamber 16' being out of communication with the port 16 when said handle is in cut-out position.

The casing 4 is also provided with the passage-way 22 which by way of the port 23 normally closed by the valve 24 is arranged to be opened to the atmosphere through the exhaust port 25 when said valve is off its seat.

The valve 24 is normally held to its seat by the electro-magnet 26 which has an armature 27 attached to the lower end of the stem of valve.

The chamber 28 in the cap 28' which is secured to the valve seat 15 by the bolts 28'' is connected by a passage to the passage-ways 19 and 20 so that the pressure from the main reservoir acts upon the upper face of the rotary valve.

When the handle is in running position there is no communication between the main reservoir pipe and the chamber 6' or the passage-way 22 and accordingly the pressure from the upper train-line pipe would act upon the lower face of the piston 6 and tend to raise the same unless means were provided for maintaining it in equilibrium. One way in which said piston may be maintained in equilibrium and prevented from rising during normal conditions is to connect the upper portion of the chamber 6' with the train-line pipe so that the same pressure will act upon both faces of the piston. This may be done by means of the by-pass 29 shown in Figs. 2 and 3 as cut into the bushing 29' of the chamber 6' and extending from a point slightly above the upper face of the piston 6 when the latter is in its lowermost position to a point a short distance below the under face of said piston when in such position.

Arranged in the casing 4 and below the lateral extension thereof which leads to the pipe ends 3', 3' is a longitudinal passage-way extending from the port 9 to the transverse passage 31, and the latter communicates with the pressure-retaining valves 32, 33 arranged as shown on either side of said lateral extension and attached thereto by the brackets 34, 35 respectively. Each pressure retaining valve is provided with a spring 36, 37, a nut 38, 39 for adjusting the tension of the same, and a cap 40, 41. The low pressure valve 33 has a valve 42 actuated by the handle 43 for opening and closing communication with the passage-way 31 and each valve is open to the atmosphere as shown at 44, 45.

The spring 36 of the low pressure valve is so adjusted that when the valve 42 is open it will release all pressure in excess of fifty pounds so that the train-line pipe pressure will slowly be reduced to fifty pounds thereby causing the full brake pressure to be exerted upon the brakes with a reduction of only about twenty pounds of pressure in the train-line pipe. The spring of the high pressure valve 32 preferably is adjusted to withstand ninety pounds per square inch and is of course only employed when the valve 42 is closed.

The operation of the apparatus above described is as follows: When the valve 24 is unseated and the passage-way 22 opened to the atmosphere there will be an excess of pressure on the under side of the piston 6 which will therefore move upwardly, the air in the chamber 6' above said piston escaping through the port 17 in the valve seat, the chamber 16' in the rotary valve, the port 16 in the valve seat, the passage-way 22 and the exhaust port 25, whereupon the blanking-valve 7 will slide over the port 10 and place the same into communication with the port 9 so that the train-line pipe pressure will be reduced, the air in said train-line pipe discharging by way of the ports 10 and 9 the passage-ways 30 and 31 and one of the pressure retaining valves 32 or 33. Such reduction in train-line pipe pressure will apply the brakes which cannot thereafter be released until the piston 6 has assumed its normal position and thereby cause the blanking valve 7 to uncover the port 10. The piston 6 may only be made to resume its normal position by throwing the handle 12 to cut-out position so that the port 18' therein will be placed above the port 18 of the valve seat and the upper portion of the chamber 6' thereby placed into communication with the main reservoir pipe, the pressure of which will drive the piston 6 down to the position shown in Fig. 2.

It will be seen that when the handle 12 is in cut-out position the air from the main reservoir pipe is admitted only to the chamber 6', the chamber 16' of the rotary valve being in such case out of communication with the port 16 so that there is no communication between the port 17 and the passage-way 22, and also that when the handle is in running position, there will be no communication between said chamber 16' and the main reservoir pipe as in the patent to Orcutt above referred to. It has been found in practice that when the chamber 16' is connected even by a pin-hole passage to the chamber 28 in the cap the main reservoir pressure acting through said pin-hole and the port 17 will cause the piston 6 to resume its normal position after it has been raised by the unseating of the valve 24 so that the brakes will be released when the last mentioned valve is off its seat. The elimination of such pin-hole port renders necessary some means such as the by-pass 29 to prevent the operation of the piston during normal conditions.

Various means may be employed for maintaining the circuit of the magnet 26 closed during normal conditions and for opening the same automatically when the block ahead of that in which the train is running has been rendered unsafe. A system for accomplishing this result is disclosed in the application of Elmer N. Hutchins and Edward E. Eames, administrators of the estate of said Edward L. Orcutt, Serial No. 125,110 filed October 11, 1916, wherein the circuit of said magnet is normally closed through the generator 46 by means of the conducting ring 47 carried by a commutator 48 which is actuated by the control magnet 49, the circuit of which is normally closed through said generator and the resistance 50 by the contact member 51. The contact member or shoe 51 is arranged to ride up over a contact plate or ramp 52 placed on the road bed and thereby break the circuit of the control magnet and loop the same into the circuit consisting in part of the running rails. When conditions are normal the current intensity in the circuit of the control magnet remains unaltered while abnormal conditions will cause said magnet to be over-energized or under-energized, and in either case the ring 47 will be shifted out of contact with the terminals of the circuit of the magnet 26 and the latter will be deënergized.

The contact plates, one of which is shown at 52, may be so long that the train will stop before it has carried the contact shoes, one of which is shown at 51, beyond the same, in which case should the brakes be released by throwing the handle 12 into cut-out position, the act of bringing the same back to running position, will immediately reset the brakes. It is of course desirable always to have the handle 12 in running position when the train is moving and it is sometimes expedient for the engineer to be able to run the train in spite of the fact that the block ahead is not safe, as for example when it is desired to creep up to the next block in order to investigate the source of danger. In order to enable the engineer to release the brakes after they have been automatically applied and the train has been brought to a standstill with the contact shoes on their respective ramps, I provide means for cutting out the automatic control system together with means for registering the number of times the engineer has operated the same during a run so as to fix the responsibility in case of accident. In the present instance the cut-out means consists in the valve 53 arranged for rotation in a suitably shaped recess 54 cut into the lateral extension of the casing 4, said valve having a central partition 55 normally in alinement with the partition 56 between the passage-ways which connect with the upper and lower train-line pipes. Secured to the arbor 57 of said valve is an operating handle 58 rigidly connected to which is a finger 59 arranged to strike the pawl 60 when the valve is closed, and said pawl coöperating with a ratchet 61 rotatably mounted in the casing 61' secured by the bracket 61'' to the lateral extension of the casing 4, turns the dial 62 so that the numbers carried thereon will appear at the window 63. At the end of the run the station-master or some other authorized person by means of a key arranged to fit over the arbor of the pinion 64 meshing with the gear 65 which carries said dial, may restore the dial to zero position.

Some times, however, the momentum of the train will carry the contact shoes beyond their coöperating ramps in which case the brakes after they have been released by moving the handle to cut-out position, will not be reset by moving said handle to running position. For this and other reasons means may be employed for registering the number of times the engineer throws the handle to cut-out position and in the present instance I have shown a register consisting of a dial 66 in a casing 66' mounted on the cap 28' by the legs 66'', said dial being loosely mounted on the stud 67 extending upwardly from the threaded arbor of the stem 13, and carrying on its under side the spring pressed pawl 68 which engages the ratchet 69 rigidly connected to and movable with said arbor. Thus the turning of the handle 12 counter-clockwise will cause the ratchet to engage the pawl and thereby rotate the disk to the left, the numerals carried by said disk appearing at the window 70. The spring finger 71 will prevent retrograde movement of the disk when the handle is again brought to running position.

It will be understood that while I have described the several elements of my invention with considerable detail, various modifications may be made therein without departing from the scope of the same as defined by the appended claims.

Having thus described an illustrative embodiment of my invention without however limiting the same thereto what I claim and desire to secure by Letters Patent is:

1. Apparatus for electrically controlling air-brakes comprising in combination a train-pipe, a blanking-valve therefor, a casing having a passageway open to the atmosphere, means normally closing said passageway, a movable abutment in said casing for actuating said blanking-valve, a seat for said blanking-valve, said seat being provided with an exhaust port, and a rotary-valve for admitting air to one face of said movable abutment when said valve is in cut-out position only and for connecting said face of said abutment only to said passage-way, when said valve is in running position.

2. Apparatus for electrically controlling air-brakes, comprising in combination a train-pipe, a blanking-valve therefor, a casing, a movable abutment in said casing for actuating said blanking-valve, a seat for said blanking-valve, said seat being provided with an exhaust port, a rotary-valve arranged to coöperate with said casing, said valve being provided with only one port passing through the same and said casing having a port with which the port in said valve registers when said valve is in cut-out position, said casing having a passage-way opening to the atmosphere, and means normally closing said passage-way, said casing having a second port and said valve being provided with a chamber in one face thereof and not passing through the same, whereby said passage-way and the last mentioned port are placed in communication when said rotary-valve is in running position.

3. Apparatus for electrically controlling air-brakes comprising in combination a train-pipe, a blanking-valve therefor, a casing having a passageway open to the atmosphere, means normally closing said passage-way, a movable abutment in said casing for actuating said blanking-valve, a seat for said blanking-valve, said seat being provided with an exhaust port, a rotary-valve for admitting air to one face of said movable abutment when said valve is in cut-out position only and for connecting said face of said abutment only to said passage-way, when said valve is in running position, and means whereby said abutment is maintained in equilibrium when said rotary-valve is in such running position.

4. Apparatus for electrically controlling air-brakes comprising in combination an air-brake equipment having an engineer's valve and a train-pipe, an automatic electrically-actuated train-stopping apparatus operating independently of the engineer's valve, said apparatus being connected with said train-pipe, and a manually operated valve for disconnecting said train-stopping apparatus from said train-pipe without reducing the train-pipe pressure whereby said air-brake equipment may be controlled by said engineer's valve.

5. Apparatus for electrically controlling air-brakes, comprising in combination an air-brake equipment having a train-pipe, an automatic electrically-actuated train-stopping apparatus connected in series between two adjacent sections of the train-pipe, whereby the air will pass from the main-reservoir pipe to the air-brakes through the train-pipe by way of the engineer's valve and said apparatus, and a manually-operated valve for disconnecting said train-stopping apparatus from said train-pipe and directly connecting said adjacent sections of said train-pipe.

6. Apparatus for electrically controlling air-brakes comprising in combination an air-brake equipment having a train-pipe, an automatic electrically-actuated train-stopping apparatus having a casing, a movable abutment arranged in said casing, said casing being provided with a lateral extension, means connecting said extension to said train-pipe, a partition dividing said extension into two passage-ways each communicating with the interior of said casing and with the adjacent sections of the train-pipe, a blanking-valve actuated by said abutment for closing one of said passage-ways, and a valve arranged in said extension and having a partition normally in alinement with the partition of said extension, said valve when turned at right angles to its normal position closing both of said passage-ways and directly connecting said adjacent sections of the train-pipe.

In testimony whereof, I have hereunto subscribed my name this 16th day of September, 1916.

ELDRIDGE IRVING LA COUNT.